2,990,062
REFRIGERATING APPARATUS
Lester M. Miller, Dayton, Ohio, assignor to General Motors Corporation, Detroit, Mich., a corporation of Delaware
Filed Dec. 9, 1957, Ser. No. 701,394
2 Claims. (Cl. 209—83)

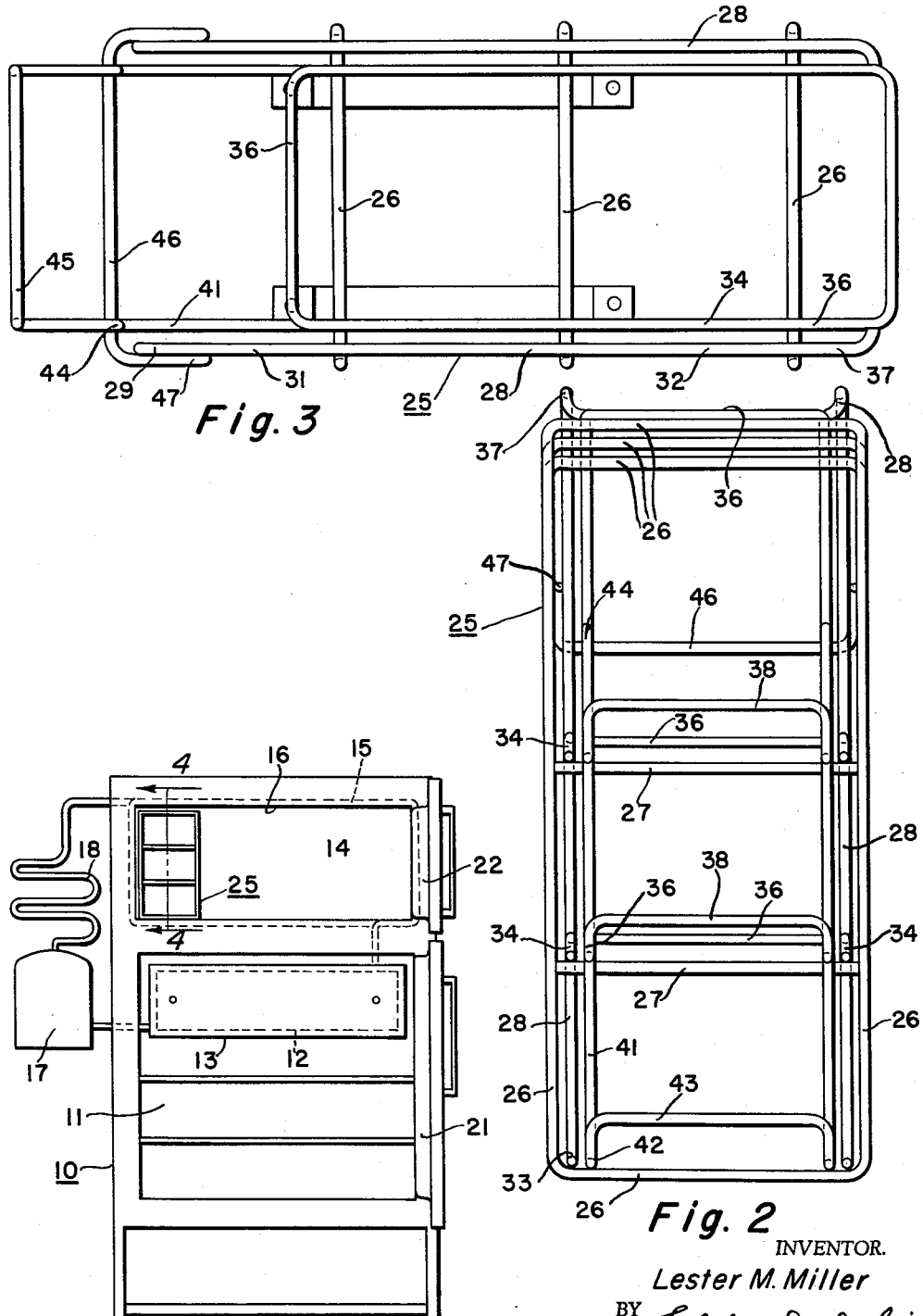

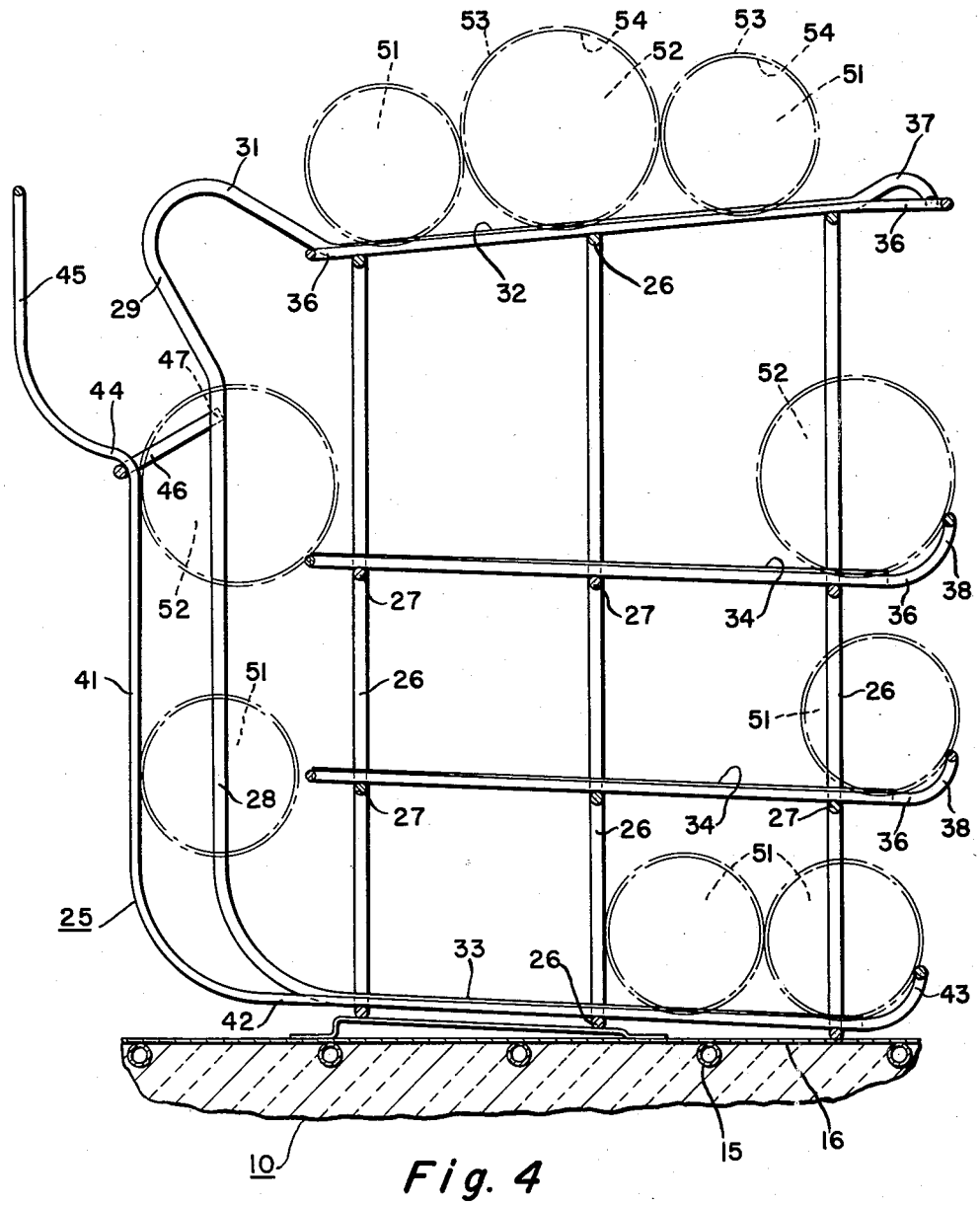

This invention relates to refrigeration and particularly to a device for receiving, dispensing and storing canned frozen comestibles in a refrigerator cabinet.

The popularity of storing frozen food products in a relatively large refrigerator freezing chest or chamber in a household refrigerator cabinet has led many users of refrigerators to store canned frozen juices or the like or canned frozen soups or the like in such a chamber. On the present day market frozen juice is contained in cans which are smaller than cans containing frozen soups and when these different size cans are taken home they are placed and stored in a freezing chamber of a refrigerator cabinet in a mixed or ungrouped manner therein thus rendering a certain or desired can difficult to find for removal from the refrigerator. In order to find a desired can of frozen juice or frozen soup for removal from the refrigerator it has, in many instances, been necessary to remove several cans and perhaps other items from a freezing chamber before the desired can may be found and access thereto had. This is a troublesome and uncomfortable task that results in loss of cold air from the freezing chamber and considerable thawing of the several frozen articles removed from the chamber before the desired item is found and made accessible for removal from the refrigerator.

It is therefore an object of my invention to provide in a freezing chamber of a refrigerator a combined dispensing and storage device for canned comestibles that will permit a housewife to remove different size cans of frozen products from a market basket and place them at random on a receiving or loading portion of the device which device will then sort or segregate cans of one size from cans of another size and dispense the segregated cans onto separate supporting means of the device in a collective group at predetermined designated easily accessible storage locations in the freezing chamber.

In carrying out the foregoing object it is another object of my invention to provide such a dispensing and storage device with a minimum of surface area to be contacted by the canned frozen items so as to retard building of frost thereon to a thickness that may impair its successful use or function.

More specifically it is a further object of my invention to provide a dispensing and storage device in a freezing chamber of a refrigerator cabinet with an open front loading portion above can supporting ledges thereof for receiving different size cans of frozen comestibles at random and means on the device for segregating and directing cans of one size onto one of the ledges and cans of the other size onto another of the ledges whereby they are stored in grouped readily accessible rows in the freezing chamber.

Further objects and advantages of the present invention will be apparent from the following description, reference being had to the accompanying drawings, wherein a preferred form of the present invention is clearly shown.

In the drawings:

FIGURE 1 is a front view of a multiple chambered refrigerator cabinet having a can dispensing and supporting device constructed in accordance with my invention located within a freezing chamber of the cabinet;

FIGURE 2 is an enlarged front view of the can dispensing and supporting device shown in FIGURE 1;

FIGURE 3 is a top view of the device; and

FIGURE 4 is an enlarged sectional view taken on the line 4—4 of FIGURE 1 illustrating cans of frozen comestibles at different locations on the dispensing device.

In order to illustrate the invention, reference is made to the accompanying drawings wherein I show in FIGURE 1 thereof a refrigerating apparatus including an insulated household refrigerator cabinet 10 of the multiple chambered type. Cabinet 10 is provided with a lower unfrozen food storage chamber 11 which is cooled to a temperature of from, for example, 37° to 43° F. by a sheet metal plate like evaporator 12 of a closed refrigerating system associated with the cabinet. Evaporator 12 is secured to and spaced from the rear wall of chamber 11 in any suitable manner behind a concealing plate or baffle 13. Cabinet 10 is also provided with an upper frozen food storage chamber 14 which is cooled to a temperature well below 30° F. for storing frozen comestibles and for freezing water in freezing devices into ice blocks or cubelets. Chamber 14 is cooled to the below freezing temperature by another evaporator 15 of the refrigerating system associated with cabinet 10. Evaporator 15 is in the form of a conduit coiled or wrapped around the outside of and secured to a metal can-like member 16 forming the liner of chamber 14. The closed refrigerating system also includes a refrigerant translating unit, shown diagrammatically and usually located in the lower portion of cabinet 10, which comprises a motor-compressor sealed in a casing 17 and a refrigerant receiver-condenser 18. Any suitable or conventional control or controls (not shown) may be employed to start operation of the motor-compressor of the translating unit and to stop its operation. An insulated door 21 hingedly mounted on cabinet 10, shown in open position, normally closes the front access opening of chamber 11 and another hingedly mounted insulated door 22, also shown in open position, normally closes the front access opening of freezing chamber 14. A canned frozen comestible receiving, segregating and dispensing device, generally represented by the reference numeral 25 in FIGURE 1, is located within the freezing chamber 14 of cabinet 10 for the storage therein of the canned goods. Device 25 is of the wire-like construction and is preferably fastened to a wall of chamber 14 in any suitable or desirable manner (not shown) so as to rigidly secure same in this chamber with its bottom supported upon liner 16. Device 25 (see FIGURES 2, 3 and 4) comprises a plurality of horizontally spaced apart wires having their ends welded together to provide rectangular upright members 26 joined together as will be presently described to form supports for the device. These rectangular upright members have vertically spaced apart straight horizontal wires or rods 27 extending from side to side of the members 26 with ends of the wires 27 abutting and welded to opposite sides thereof. A pair of spaced apart substantially U-shaped wires 28, bent as at 29 and 31 for purposes to be hereinafter described, have one of their legs, upper leg 32, extending across the top of and welded to wire members 26 and have their lower leg 33 extending across and welded to the top of the bottom portion of wire members 26. Straight wires or bars 34 extend across the plurality of rectangular members 26 at each side of device 25 on top of wires 27 in spaced relation to sides of the members 26 and are rigidly secured or welded to the cross wires 27. One wire loop 36 of a plurality thereof extends across and is welded to the top of the rectangular members 26 while two other lower vertically spaced apart loops 36 extend across and are welded to the straight cross wires 27. These wire loops 36 have their elongated side portions spaced inwardly of the straight bars 34 and spaced inwardly of the upper leg 32 of U-shaped wires 28 for a purpose to be hereinafter described. The forward part of the upper leg 32 of wires 28 is curved or bent upwardly and thence downwardly as at 37 (see Figure 4) with the ends of wires 28 adjacent bend 37 bent inwardly (see FIGURES 2 and 3) and welded to sides of the upper wire loop 36. The forward part of vertically spaced apart wire loops 36, intermediate the top and bottom of device 25, is bent upwardly as at 38 (see FIGURES 2 and 4) to form a stop for cans at the open front of ledges provided by the loops 36 for holding cans thereon. Another larger substantially L-shaped wire loop 41, within the spaced apart wires 28, has its lower leg portions 42 welded to the bottom of upright rectangular members 26 with its forward part curved or bent upwardly as at 43 (see FIGURE 4). The vertical part of L-shaped wire loop 41 is bent as at 44 to provide an upstanding portion 45 spaced rearwardly from the bent portion 29 of U-shaped wires 28 and is also spaced from the rear part of the uppermost wire loop 36. A connector or reinforcing wire 46 extends around and is welded to the bent portion 44 of L-shaped wire loop 41 and has its ends 47 welded to the side portions of the upstanding part of U-shaped wires 28. The arrangement of the wires and bars of device 25 and the welding together thereof provides a rigid unitary wire rack device. Upper wire loop 36 and the elongated top portion 32 of U-shaped wires 28 are inclined upwardly from the back to the front of device 25 and these wires provide the device with an open front loading portion adapted to receive cans of frozen comestibles of different size with respect to one another at random thereon. The wire loops 36 below the top or loading portion of device 25 as well as the lower leg 33 of U-shaped wires 28 and portion 42 of wire loop 41 provide the device with vertically spaced apart open front can supporting ledges. Upright parts of U-shaped wires 28 and wire loop 41, spaced rearwardly from the wire loops 36, provide a chute at the back of device 25. Upright part of U-shaped wires 28, located intermediate the back of wire loops 36 and wire loop 41, provides a barrier at the sides of the vertical chute to prevent cans moving downwardly therein from sliding sidewise out of sides of device 25 thereof and serve to properly position the cans on track portions of ledges provided on the device. It is to be noted that the wire members providing the plurality of superimposed spaced apart lower can supporting ledges of device 25 are inclined, opposite upper loop 36, downwardly from the rear portion of the device to the front thereof. The spacing of wire loops 36 inwardly of upper leg portion 32 of U-shaped wires 28 and straight wires or bars 34 and of portion 42 of L-shaped wire loop 41 inwardly of lower leg portion 33 of wires 28 provide a guide means along the elongated track part of the loading portion and of the can supporting ledge portions of rack device 25. Bend 44 in wire loop 41 provides the rack or dispensing device 25 with a segregating means for cans of different size placed on the upper loading portion of the device for a purpose to be presently described.

Some canned frozen comestibles now obtainable in groceries or supermarkets are contained in cans of a different size relative to one another. For example, frozen soups are contained in round cans having a length of approximately 3⅞ inches comprising a cylindrical portion of approximately 2¹⁰⁄₁₆ inches in diameter and provided with outwardly flanged ends of approximately 2¹¹⁄₁₆ inches in diameter whereas frozen vegetables or fruit juices are packaged in round cans having substantially the same length as the canned frozen soups but comprising a cylindrical portion which is approximately 2³⁄₃₂ inches in diameter and having outwardly flanged ends of approximately 2⁵⁄₃₂ inches in diameter. When a housewife returns home from shopping, at a grocery or supermarket with baskets or bags filled with food products, frozen comestibles in cans of a different size relative to one another are removed from the baskets or bags and ordinarily placed, in mixed or scattered fashion, in the freezing or frozen food chamber of a household refrigerator cabinet. This results in the different sized cans being stored in the refrigerator without any grouping together or designated place of storage for the various cans. Thus when a certain or specific can is desired to be removed from the refrigerator several cans and/or other packaged frozen foods must be removed before the desired can is found and access had thereto. My presently disclosed combined dispensing and storage device 25 eliminates this objectionable and troublesome task and establishes a designated or predetermined locality in a frozen food chamber for the storage of canned frozen comestibles of different size with respect to one another in grouped fashion so that canned soup or the like and canned fruit or vegetable juices will be separated and each readily and independently accessible.

Having described the structure of my can receiving, segregating, dispensing and storage device 25 I will now proceed to explain the use or utility thereof. As a housewife removes round cans of different size from her market baskets or bags such, for example, as frozen juice or the like in cans of a given size and frozen soups or the like in cans of a relatively larger diameter she may place the cans alternately or at random, as indicated by the dot-dash lines 51 and 52, on the top or in the open front loading portion, wire legs 32 and wire loops 36, of device 25. The outwardly flanged ends 53 of the similar length but different diametered cans 51 and 52 fit between legs 32 of U-shaped wires 28 and the upper wire loop 36 so that the cylindrical portion 54 of the cans, intermediate their ends 53, rest on the track formed by the upper wire loop 36 at the top loading portion of the device. The wires 36 and 32 thus form or provide a guide means for the cans along the loading portion of device 25. Upwardly curved parts 37 of the legs 32 of wires 28 serve to locate and facilitate proper placing of the cans 51 and 52 on the loading portion of device 25. Since the track at the loading portion of the dispensing and storage rack device is inclined downwardly from its open front to the back thereof the different size cans 51 and 52 rotate and roll rearwardly along device 25 toward and into the chute portion thereof. Upon gravitating in the chute portion of device 25 smaller cans 51 will move past the shouldered or bent part 44 of wire loop 41 at the back of the device and will clear the rear end of wire loop 36 next below the loading portion of device 25. The smaller cans 51 of frozen fruit or vegetable juice fall to the bottom of device 25 and are directed or dispensed, by the lower curved part of wire loop 41, onto the bottom can receiving ledge, leg portions 33 of U-shaped wires 28 and base part 42 of L-shaped wire loop 41, whereupon they roll forwardly thereon to the open front of this ledge against the upturned forward part 43 of wire loop 41. It is to be understood that if a quantity of small cans 51 are placed in succession on device 25 the lower ledge may become fully occupied and other smaller cans subsequently gravitating within the chute will, upon striking another smaller can at the rear of the lower ledge of the device, be directed or dispensed onto the next upper can supporting ledge. The two ledges for receiving the smaller cans 51 provides the device 25 with greater storage space for canned juices or the like than canned soups which is desirable in most homes since more juice is consumed. A larger can 52 of frozen soup or the like upon leaving the loading portion of device 25 and gravitating into the rear chute thereof is too great in diameter to pass between the back, wire loop 41, of the chute and the rear end of wire loop 36 below the top of the device and consequently this larger can 52 strikes the shouldered or bent part 44 of wire loop 41 and bounces away from same or rebounds forwardly thereof whereupon the larger can or cans 52 is or are directed or dispensed laterally onto the supporting ledge, wire loop 36, immediately below the top of device 25 and will roll to the open front thereof. The showing in dot-dash lines in FIGURE 4 of the drawings of a large can 52 intermediate the rear end of wire loop 36 and wire 41 is merely to illustrate that it is impossible for this larger diametered can to pass through the segregating means provided on the frame-like structure of device 25 and this showing is in no way to be considered indicative of a large can 52 being lodged at this point since such would render the device ineffective to carry out its intended purpose. In the manner described above frozen comestibles contained in the different sized cans 51 and 52 alternately placed on the loading portion of device 25 or at random thereon are segregated from one another and the separated smaller cans 51 directed or dispensed onto one of the lower can supporting ledges while the larger cans 52 are directed or dispensed onto another of the can supporting ledges above a ledge which receives the smaller cans 51. The cans 51 and 52 are guided in their travel within device 25 by their outwardly flanged ends 53 fitting between wire members on opposite sides of the tracks in the various portions of the device so that the cans will not strike the upright portions of the rectangularly shaped wire members 26 and clog the device. Thus the different size cans are collected on or in predetermined separated storage spaces within the frozen food chamber of a refrigerator cabinet in grouped fashion and are accessible at designated localities in the open front of device 25.

It should, in view of the foregoing, be apparent that I have provided an improved arrangement for receiving and storing canned comestibles in a frozen food chamber of a household refrigerator cabinet. My improved device is of an open wire and rod type constructed of metal of low heat conductivity and consequently accumulation of frost or ice thereon in a below-freezing frozen food storage chamber is minimized. The can segregating means or portion of my device is responsive automatically to a difference in diameter of cans of frozen comestibles for separating the different size cans from one another and dispensing the cans of one size onto predetermined storage ledges while cans of the other size are dispensed onto another storage ledge. The can receiving, segregating, dispensing and storage device is of light weight and of low manufacturing cost and provides an open front structure in a frozen food storage chamber of a refrigerator cabinet by which cans of different size are readily accessible at predetermined designated points to thus eliminate the necessity of a user of the refrigerator groping around in the chamber for a desired can of a specific frozen comestible.

While the form of embodiment of the invention as herein disclosed constitutes a preferred form, it is to be understood that other forms might be adopted, as may come within the scope of the claims which follow.

What is claimed is as follows:

1. A combined substance-containing can sorting and retaining device for use in a refrigerated chamber of a refrigerator cabinet normally closed by a door comprising, a unitary frame-like structure supporting vertically spaced apart open front ledges each adapted to receive and have stored thereon a plurality of elongated substantially cylindrical cans, a loading portion for said device supported by said structure above and in vertical alignment with said storage ledges, said loading portion being adapted to have cans of a predetermined diameter and cans of greater diameter than the cans of said predetermined diameter placed at random thereon, said loading portion being inclined downwardly from the front of said structure toward a chute provided in the rear of said device, said chute being located behind said storage ledges and extending continuously therealong for receiving cans from said loading portion thereabove, a single segregator for said spaced apart storage ledges, said segregator being within said chute for directing cans entering same to one of said storage ledges, said single segregator forming the sole means associated with said device for sorting the different diametered cans from one another, said segregator being devoid of movable parts and constructed and arranged to gravitationally discharge cans of said greater diameter therefrom onto the uppermost of said storage ledges and to permit cans of said predetermined diameter to continue onto the storage ledge below said uppermost ledge, and means on said structure at the open front of each storage ledge holding cans received thereby in a row thereon for selective removal from said device when said chamber door is opened.

2. A device as defined by claim 1 wherein the unitary frame-like structure and elements thereof are formed entirely of preshaped wire members rigidly bonded together.

References Cited in the file of this patent
UNITED STATES PATENTS

| | | |
|---|---|---|
| 374,680 | Keeney | Dec. 13, 1887 |
| 717,726 | Vincke | Jan. 6, 1903 |
| 739,736 | Speiser | Sept. 22, 1903 |
| 1,070,601 | Haynie | Aug. 19, 1913 |
| 1,103,647 | Bair | July 14, 1914 |
| 1,458,515 | Boring | June 12, 1923 |
| 1,848,890 | Kennedy | Mar. 8, 1932 |
| 2,122,322 | Kidwell | June 28, 1938 |
| 2,125,000 | Considine | July 26, 1938 |
| 2,234,424 | Alley | Mar. 11, 1941 |
| 2,239,176 | Waitzman | Apr. 22, 1941 |
| 2,453,280 | Stewart | Nov. 9, 1948 |
| 2,679,143 | Helsing | May 25, 1954 |
| 2,761,289 | Saunders | Sept. 4, 1956 |